United States Patent [19]

Beer et al.

[11] Patent Number: 4,818,319
[45] Date of Patent: Apr. 4, 1989

[54] PROCESS FOR REDUCING THE WATER VAPOUR DIFFUSION IN A PLASTICS COMPOSITE INSULATOR CONSISTING OF SEVERAL LAYERS

[75] Inventors: Hans-Rudolf Beer, Binz; Helmut Britsch, Schinznach-Dorf; Elias Jülke, Wettingen; Tony Kaiser, Buchs, all of Switzerland

[73] Assignee: BBC Brown, Boveri & Company, Limited, Baden, Switzerland

[21] Appl. No.: 837,833

[22] Filed: Mar. 10, 1986

[30] Foreign Application Priority Data

Apr. 4, 1985 [CH] Switzerland .......................... 1473/85

[51] Int. Cl.⁴ .......................... B32B 31/12; H01B 3/04
[52] U.S. Cl. ...................................... 156/192; 156/53; 156/191; 174/137 A; 174/137 R; 428/454
[58] Field of Search ........................ 156/53, 191, 192; 174/137 A, 137 B, 137 R; 428/454

[56] References Cited

U.S. PATENT DOCUMENTS 4,265,966 5/1981 Schuh .............................. 156/53 X

FOREIGN PATENT DOCUMENTS 49-31280 8/1974 Japan ..................................... 156/53

Primary Examiner—Robert A. Dawson
Attorney, Agent, or Firm—Oblon, Fisher, Spivak, McClelland & Maier

[57] ABSTRACT

Process for reducing the water vapour diffusion in a plastics composite insulator consisting of several layers by incorporation of at least one mica-containing layer as diffusion barrier in the form of a surface or intermediate layer on at least one plastics body, constituting the composite insulator.

10 Claims, 1 Drawing Sheet

PROCESS FOR REDUCING THE WATER VAPOUR DIFFUSION IN A PLASTICS COMPOSITE INSULATOR CONSISTING OF SEVERAL LAYERS

The invention relates to a process for reducing the water vapour diffusion in a plastics composite insulator which consists of several layers.

In transformers, overvoltage arresters and switches, in particular for outdoor installation, generally jacket-like and overflow-like porcelain bodies are used. As porcelain is expensive and bodies of large dimensions are difficult to produce or cannot be produced at all, it is attempted to replace this material by plastics. This resulted in the plastics composite insulator. As an example, the glass-fibre reinforced plastics insulator may be mentioned. However, such insulators have a relatively high water vapour permeability, which can lead prematurely to electrical break-downs. Although the water vapour diffusing in can be retained by suitable absorbents, their absorbency is usually limited.

It is therefore necessary to incorporate water vapour diffusion barriers in plastics insulators. On account of the water vapour permeability which virtually all plastics still have, such plastics are ruled out for this. Metal foils cannot be used either on account of their electrical conductivity.

There is therefore a great need to improve the conventional material combinations for such insulating bodies.

The invention is based on the object of specifying a process for reducing as effectively as possible the water vapour diffusion in a composite insulator, preferably for outdoor installation, consisting of several layers and made up of plastics and reinforcing means, which can be of simple design and is suitable for cost-effective production.

This object is achieved by applying one mica containing surface or intermediate layer as a diffusion barrier onto the composite insulator.

The invention is described with reference to the following exemplary embodiments illustrated in detail by figures, in which FIG. 1 shows a diagrammatic longitudinal section through a plastics composite insulator with inside diffusion barrier, FIG. 2 shows a diagrammatic longitudinal section through a plastics composite insulator with outside diffusion barrier, FIG. 3 shows a diagrammatic longitudinal section through a plastics composite insulator with inside and outside diffusion barriers, FIG. 4 shows a diagrammatic longitudinal section through a plastics composite insulator with inside diffusion barrier and outside screen body for outdoor installation.

Figure 1:
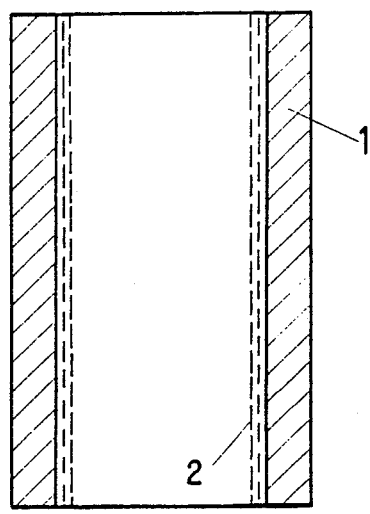
FIG. 1 illustrates a diagrammatic longitudinal section through a plastics composite insulator with inside diffusion barrier. The insulator consists essentially of a hollow-cylindrical—glass-fibre reinforced plastics body 1 (tube) with an inside mica-containing layer 2, which acts as water vapour diffusion barrier.
Figure 2:
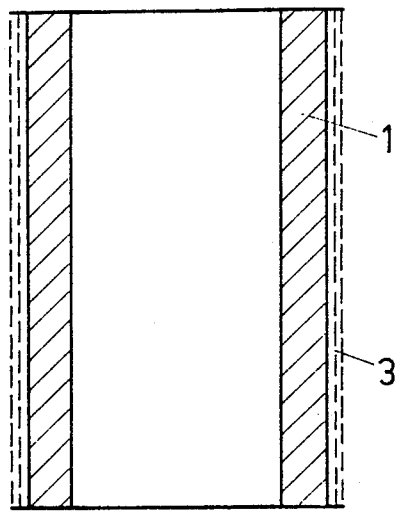
FIG. 2 illustrates a diagrammatic longitudinal section through a plastics composite insulator with outside diffusion barrier. The tubular plastics body 1 bears an outside mica-containing layer 3.
Figure 3:
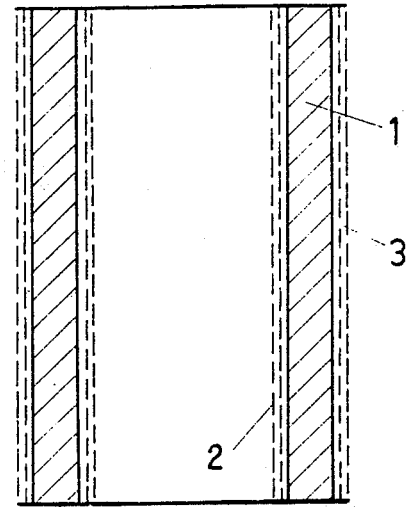

Shown in FIG. 3 is a longitudinal section (diagrammatic) through a plastics composite insulator with inside and outside diffusion barriers. The structure is, so to speak, a combination of FIG. 1 and FIG. 2. The plastics body 1 bears both an inside (2) and an outside (3) mica-containing layer; thus it has a double diffusion barrier.

Figure 4:
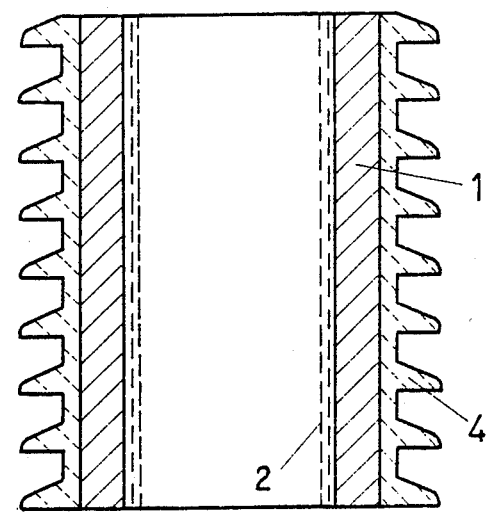

FIG. 4 illustrated a diagrammatic longitudinal section through a plastics composite insulator with inside diffusion barrier and outside screen body for outdoor installation. The structure is essentially similar to FIG. 1. The glass-fibre reinforced plastics body 1 is provided with an inside mica-containing layer 2 and an outside screen body 4 which, as a ribbed jacket, makes the insulator suitable for outdoor installation.

EXEMPLARY EMBODIMENT 1

A plastics composite insulator with diffusion barrier was produced in accordance with the so-called wet winding process.

On a smooth, hollow-cylindrical steel winding spindle of 300 mm diameter, warmed by means of internal heating to a temperature in the range of 40°–60° C. and provided with a parting agent as surface layer, was first wound a preimpregnated mica/glass fabric tape (Romicafil 249 by Micafil, Zurich). Two oppositely running plys, ½ overlapped, were produced. The total radial thickness of this inner mica-containing layer 2 was 0.6 mm. On this hollow-cylindrical layer 2 was applied, by winding-on, a glass-fibre reinforced plastics body 1. For this purpose, a strand of parallel glass fibres (Roving 2400 Tex, type OC-859 by Owens Corning) was drawn under slight pre-tension through an impregnating bath of a synthetic resin, for the purpose of impregnation. The impregnating bath had the following composition:

- 100 parts by weight epoxy resin (Araldit LY556 by Ciba-Geigy, Basle)
- 80 parts by weight hardener based on carboxylic acid anhydride (hardener HT 907 by Ciba-Geigy, Basle)
- 2 parts by weight accelerator (DY 063 by Ciba-Geigy)

The impregnating bath was held at a temperature between 40 and 60° C. by means of an infrared radiator. The discharge of the bath was fitted with a wiper for the removal of surplus resin from the strand. The winding speed was about 15 m/min. Any air bubbles which may form in the intake zone of the tape can be made to burst and rendered harmless, for example by means of a hot air jet. It should be noted that air inclusions of any kind must be avoided during winding-on in production of the plastics body. After reaching a radial wall thickness of the plastics body of 3.5 mm, the winding spindle was brought to a temperature lying between 110° and 120° C., the plastics body being initially hardened from inside outwards. After this initial hardening, the plastics body 1, together with mica-containing layer 2, was stripped off the winding spindle by means of an hydraulic press and subsequently finish-hardened completely for 2 hours at a temperature of 140° C.

EXEMPLARY EMBODIMENT 2

A plastics composite insulator was produced in accordance with the process specified for embodiment 1, although a preimpregnated polyester nonwoven/mica tape (Romicapreg 292 by Micafil) was used for making up the inside mica-containing layer 2. The thickness of the layer 2 was 0.8 mm. All other process steps were identical to those under embodiment 1.

EXEMPLARY EMBODIMENT 3

A plastics composite insulator was produced in accordance with the process specified under embodiment 1, the inside mica-containing layer 2 being made up from a preimpregnated tape consisting of glass fabric, mica and a plastics film. The subsequent process steps were the same as those specified under embodiment 1.

Attention should also be drawn to the fact that a tape with a glass fabric/mica/glass fabric structure, as offered by Midwest Mica & Insulation Co., Cleveland, may also be used for this.

EXEMPLARY EMBODIMENT 4

A plastics composite insulator with diffusion barrier was produced in accordance with the so-called dry winding process.

On a smooth winding spindle, covered with a parting film, similar to embodiment 1, first a class tape was wound dry, without resin impregnation, upto a radial thickness of 3.5 mm. Thereafter 2 plys, ½ overlapped, of a non-impregnated tape containing mica flakes and covered on both sides with a plastics nonwoven (type V 160 by Isovolta) was dry wound. The whole thing was then introduced into a vacuum-tight container and the latter was evacuated to a residual pressure of less than 700 Pa. Then a synthetic resin mixture of the composition according to embodiment 1 was drawn into the dry wound body and the container thereupon subjected to an overpressure of about 0.1 MPa. The gelling and hardening of the synthetic resin after impregnation was performed in analogy with the process steps specified in embodiment 1.

For making up the outer mica-containing layer 3, a tape containing mica flakes and covered on both sides with a glass tape may also be used. Another variant consists in the use of a glass tape containing 10–15% binding agent and covered on both sides with mica by Midwest Mica & Insulation Co., Cleveland.

EXEMPLARY EMBODIMENT 5

A plastics composite insulator according to the structure of FIG. 3, i.e. both with inside (2) and with outside (3) mica-containing layer, was produced in accordance with the process specified under embodiment 4. For making up these layers 2 and 3, the abovementioned glass tape with mica layers on both sides by Midwest Mica & Insulation Co. was used.

EXEMPLARY EMBODIMENT 6

A plastics composite insulator with double diffusion barrier was produced in accordance with the vacuum/-pressure impregnating process.

For this purpose, a casting mould consisting of a core tube and a jacket tube was used. First of all, the mica-containing layer 2 according to embodiment 4 was wound onto the core tube. This was followed by the fold-free winding-on, under slight pretension, of a glass fabric, and finally once again a mica-containing layer 3. The finish-wound core tube was then pushed into the jacket tube and, as specified under embodiment 4, impregnated with synthetic resin with the application of a vacuum followed by pressure.

EXEMPLARY EMBODIMENT 7

A plastics composite insulator with a diffusion barrier and jacket for outdoor installation was produced as follows:

On the inside of a glass-fibre reinforced hollow-cylindrical plastics body 1 was centrifuged an about 2 mm thick (measured radially) epoxy-based plastics composition filled with mica flakes, with hydrosilicon-based coupling agent. The plastics composition of this layer 2 was finished-hardened in a known way. Finally, a jacket for outdoor installation, in the form of a screen body 4 was applied to the plastics body 1 by casting around it with a silicon elastomer instead of the mica, the filled plastics composition used for the diffusion barrier may also contain mica, micaceous iron ore and/or glass flakes.

The invention is not restricted to the exemplary embodiments.

It goes without saying that the structure of the composite insulator may also comprise several plastics bodies 1. Similarly, combinations of the variants diagrammatically specified in FIGS. 1 to 4 are possible. The application of the screen body 4 forming the outer jacket for outdoor installation may be performed in principle by casting round, bonding to or winding on the mica-containing layer 3 acting as diffusion barrier or the plastics body 1. Instead of tapes, as the base of the mica-containing layers 2, 3, broad webs of suitable fabrics and webs of baseless mica papers may also be used.

As impregnating and coating resins, other compositions of plastics than those specified in the embodiments may be used, depending on requirements, in particular those based on epoxy, as well as unsaturated polyester resins, vinyl ester resins, polyurethanes etc.

The new plastics composite insulators are distinguished by greatly reduced water vapour diffusion, which makes them suitable in particular for installation under aggravated conditions. Coming into consideration in particular here is installation in damp rooms, under tropical conditions and outdoor installation.

We claim:

1. A process for reducing water vapor diffusion in a plastics composite insulator, comprising:
applying a diffusion barrier layer consisting of at least one filled resin layer as either a surface layer or an intermediate layer onto an area of said insulator, said diffusion barrier layer being produced by centrifuging a synthetic resin filled with mica, mica containing iron as a constituent and/or glass flakes onto at least one of the layers of the plastics composite insulator.

2. The process according to claim 1, wherein said diffusion barrier is a pre-impregnated mica/glass fabric tape or a pre-impregnated polyester nonwoven/mica tape.

3. The process according to claim 1, wherein said diffusion barrier is a pre-impregnated tape consisting of glass fabric, mica and a plastic film.

4. The process according to claim 1, wherein said diffusion barrier is a non-impregnated tape, containing mica flakes and covered on both sides with a plastic non-woven or a glass tape.

5. A process according to claim 1, wherein said diffusion barrier is a glass tape covered on both sides with mica flakes.

6. A process for reducing water vapor diffusion in a plastics composite insulator comprising:
applying a diffusion barrier layer consisting of at least one filled resin layer as either an inside surface layer, an outside surface layer or an intermediate layer onto said insulator, said diffusion barrier layer produced by centrifuging a synthetic resin filled with mica, mica containing iron as a constituent and/or glass flakes onto at least one of the layers of the plastics composite insulator.

7. The process according to claim 6, wherein said diffusion barrier is a pre-impregnated mica/glass fabric tape or a pre-impregnated polyester nonwoven/mica tape.

8. The process according to claim 6, wherein said diffusion barrier is a pre-impregnated tape consisting of glass fabric, mica and a plastic film.

9. The process according to claim 6, wherein said diffusion barrier is a non-impregnated tape, containing mica flakes and covered on both sides with a plastic non-woven or a glass tape.

10. The process according to claim 6, wherein said diffusion barrier is a glass tape covered on both sides with mica flakes.

* * * * *